May 8, 1923.
H. THUN
1,454,382
ADDING MACHINE PARTICULARLY FOR LEATHER MEASURING MACHINES
Filed Dec. 6, 1920
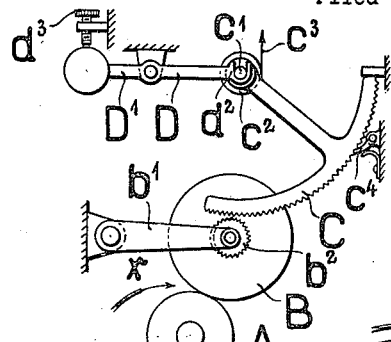
Fig. 1.
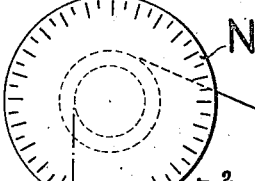
Fig. 2.
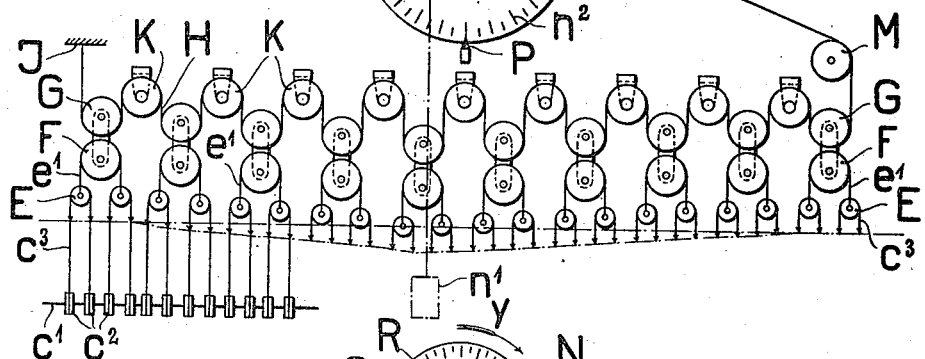
Fig. 3.
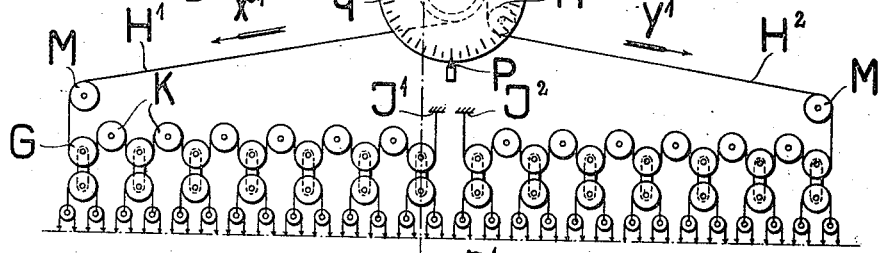
Fig. 4.
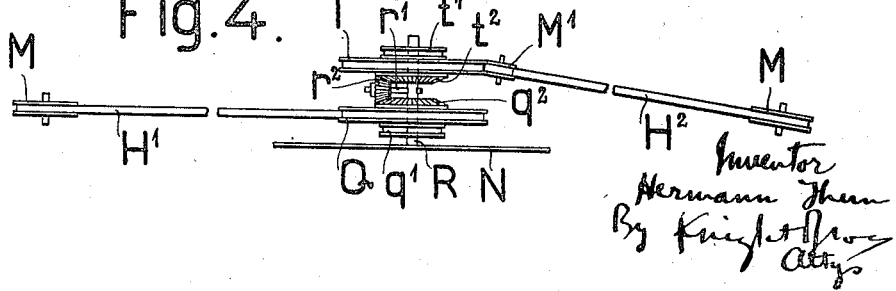
Inventor
Hermann Thun
By Knight Bros
Attys Patented May 8, 1923.

1,454,382

UNITED STATES PATENT OFFICE.

HERMANN THUN, OF ESSEN, GERMANY, ASSIGNOR TO FRIED. KRUPP AKTIEN-GESELLSCHAFT, OF ESSEN-ON-THE-RUHR, GERMANY.

ADDING MACHINE PARTICULARLY FOR LEATHER-MEASURING MACHINES.

Application filed December 6, 1920. Serial No. 428,799.

*To all whom it may concern:*

Be it known that I, HERMANN THUN, residing at Essen, Germany, a citizen of the German Republic, have invented a certain new and useful Improvement in Adding Machines Particularly for Leather-Measuring Machines (for which I have applied for patent in Germany August 11, 1919), of which the following is a specification.

The invention relates to adding devices intended particularly for leather measuring machines in which the lengths of strips of equal width, into which the leather to be measured is divided up by the measuring members of the machine, are transmitted in their sum through the measuring members to the reading off device of the adding gear.

In a known device of this kind a band is employed which is connected to an indicating apparatus and the said band is so passed over a loose and a fast roller alternately that it touches the several rollers on less than the half of their circumferences. To guide the band in this way requires an additional arrangement, which enables the loose rollers to be moved each time by a small amount only and always returned to their original position again after this movement. The object of this invention is to provide a device of the kind hereinbefore mentioned, in which such an additional arrangement is avoided.

On the drawing there are shown in diagram a leather measuring machine of a known design, the adding device being left out, and two examples of construction of the subject matter of this invention.

Fig. 1 is a lateral elevation of the leather measuring machine.

Fig. 2 is a front elevation of the first example of construction.

Fig. 3 is a front elevation of the second example of construction, and

Fig. 4 is, on a larger scale, a plan view belonging to Fig. 3, certain parts being omitted.

The leather measuring machine, Fig. 1 will first be briefly explained.

On a roller A mounted in fixed bearings there lie at equal distances from each other discs B, which are rotarily mounted at the free end of a pivotal arm $b^1$. With each disc B a pinion $b^2$ is rigidly connected. Above the latter there is mounted a toothed sector C secured by a ratchet $c^4$ so that it is out of engagement with the pinion $b^2$. The toothed sector C is mounted freely rotatable on a shaft $c^1$ which is mounted in a step $d^2$. The step $d^2$ is situated at one arm D of a two-armed lever D $D^1$, the other arm $D^1$ of which is under the influence of a set screw $d^3$. With the toothed sector C a disc $c^2$ is rigidly connected. On the latter a band $c^3$ is fastened which leads to an element of an adding device.

If a piece of leather is passed on to the roller A—in rotation—in the direction of the arrow $x$, this piece of leather lifts the disc B, the pinion $b^2$ comes into engagement with the toothed sector C and rotates it as long as the piece of leather is between the roller A and the disc B. On rotation of the toothed sector C the disc $c^2$ also rotates, it winds up the band $c^3$ and acts upon the adding device.

The arrangement of the adding device forming the subject matter of the invention may be seen in its first example of construction from Fig. 2. On this figure a number of the discs $c^2$ are represented the whole of which are mounted freely rotatable on the shaft $c^1$. Each two adjoining discs $c^2$ are connected with each other by a band $c^3$ which is guided over a loose roller E, the band $c^3$ being fixed in such a way on the periphery of the disc $c^2$ that it is wound up in a definite direction of rotation of the discs $c^2$. The spindles of each two adjoining rollers E are each fastened to one end of a band $e^1$ which is guided over a loose roller F. The latter is suspended on a further loose roller G which is carried on a band H one end of which is fastened to a fixed point J. The band H is guided alternately over one of the loose rollers G and a fixed roller K, the band H touching the rollers G and K on the half of their circumferences. Its other end is, after being guided in guide roller M, fastened to a figure disc N. The latter is under the action of a weight $n^1$ which tends to wind up the band H on the disc N. Opposite the scale $n^2$ of the figure disc N there is a fixed reference mark P.

When measuring the piece of leather those discs $c^2$ wind up a portion of the band $c^3$ the corresponding discs B of which are lifted by the leather so that the corresponding pinions $b^2$ come into engagement with the toothed sector C. The pull of the band $c^3$ is followed by the loose rollers F and G and therefore by the latter the band H is likewise pulled downwards. This results in a rotation of the figure discs N in the direction of the arrow $y$ and against the action of the weight $n^1$. In this case as the band H touches the rollers G and K on the half of their circumferences, equal movements of the rollers G correspond to equal angles of rotation of the figure disc N. If it is assumed that by means of one single band $c^3$ through the one disc $c^2$ the length $\alpha$ and by means of the other disc $c^2$ the length $\beta$ is wound up, the spindle of the roller E would be moved downwards by $$\frac{\alpha+\beta}{2}$$

and the spindles of the rollers F and G by $$\frac{\alpha+\beta}{4}.$$

On the other hand, in consequence of the action of the loose rollers G, a length of $$2 \cdot \frac{\alpha+\beta}{4} = \frac{\alpha+\beta}{2}$$

of the band H is unwound from the figure disc N. If therefore the individual ends of the bands $c^3$ are wound up by $\alpha$, $\beta$, $\gamma$, $\delta$, a length $$\frac{\alpha+\beta+\gamma+\delta+\ldots}{2}$$

of the band H is unwound from the figure disc N. The amount of the rotation of the figure disc N taking place on unwinding the band H is ascertained by the mark P. The division of the scale $n^2$ is preferably so selected that not the sum of the lengths of the individual strips but the product of this sum by the width of the strips, i. e. the total area to be determined of the piece of leather can be read off of the mark P.

In the second example of construction (Figs. 3 and 4) the band leading to the figure disc N is subdivided into two bands $H^1$ and $H^2$. One end of the band $H^1$ is suspended to a fixed point $J^1$, the other end is fastened to a disc Q which is mounted freely rotatable on a shaft R the band again being guided, between its ends, alternately over a loose roller G and a fixed roller K and finally over a guide roller M. With the disc Q there is rigidly connected on the one hand, a disc $q^1$ which is under the action of a weight $n^1$ and, on the other hand, one of the sun wheels, $q^2$, of a planetary gear. The planet pinion $r^2$ of this planetary gear is rotatably mounted on an arm $r^1$ which is rigidly fixed to the shaft R. On the shaft R there is also mounted the figure disc N, opposite the scale $n^2$ of which there is once again provided a reading-off mark P. One end of the band $H^2$ is suspended to a fixed point $J^2$. The other end is fixed to a disc T freely rotatable on the shaft R; the band $H^2$ being alternately guided over a loose roller G and a fixed roller K and finally over guide rollers M and $M^1$. With the disc T there is rigidly connected a disc $t^1$ which is under the action of a weight and the second sun wheel $t^2$ of the planetary gear. The entire arrangement is so devised that in case of a pull exerted on the band $H^1$ in the direction of the arrow $x^1$ and also in the case of a pull exerted on the band $H^2$ in the direction of the arrow $y^1$ the rotation of the figure disc N in the direction of the arrow $y$ takes place.

The mode of operation of the second example of construction is essentially the same as that of the first example. Only, other conditions being equal, owing to the providing of the planetary gear $q^2\ r^2\ t^2$ the rotation of the figure disc N is smaller than in the first example. This renders it possible, with otherwise equal dimensions of the measuring machine proper (Fig. 1), particularly as regards its width, to increase either the range of measurement or, by providing a larger number of discs B with corresponding parts C, $c^2$, E, F, G, K, the accuracy of measurement.

Claims.

1. In a leather measuring machine the combination of an indicator, a series of fixed pulleys and a series of movable pulleys, an integrating band connected to and operating the indicator and passing alternately over the fixed pulleys and under the movable pulleys, said integrating band touching said pulleys on the half of their circumferences, measuring wheels and winding up bands operated thereby, said winding up bands being articulated to the movable pulleys, whereby the indicator is moved continuously in exact proportion to the area of leather passed over.

2. In combinating with a plurality of band movement integrators, a differential gear comprising a plurality of sun gears, one for each band integrator, and a planetary gear means said planetary gear means comprising an indicating needle controlled in its movement by the movement of said sun gears, and a scale means for said needle.

The foregoing specification signed at Essen, Germany, this 1st day of July, 1920.

HERMANN THUN.

In presence of—
HANS GOTTSMANN,
CARL MÜLLER.